US010773818B2

(12) United States Patent
Vaisman

(10) Patent No.: US 10,773,818 B2
(45) Date of Patent: Sep. 15, 2020

(54) TRANS-CRITICAL CO2 COOLING SYSTEM FOR AEROSPACE APPLICATIONS

(71) Applicant: Rolls-Royce Corporation, Indianapolis, IN (US)

(72) Inventor: Igor Vaisman, Carmel, IN (US)

(73) Assignee: Rolls Royce Corporation, Indianapolis, IN (US)

( * ) Notice: Subject to any disclaimer, the term of this patent is extended or adjusted under 35 U.S.C. 154(b) by 1202 days.

(21) Appl. No.: 14/583,931

(22) Filed: Dec. 29, 2014

(65) Prior Publication Data

US 2015/0191254 A1 Jul. 9, 2015

Related U.S. Application Data

(60) Provisional application No. 61/921,689, filed on Dec. 30, 2013.

(51) Int. Cl.
*B64D 33/08* (2006.01)
*F25B 40/00* (2006.01)
(Continued)

(52) U.S. Cl.
CPC .............. *B64D 33/08* (2013.01); *F25B 1/10* (2013.01); *F25B 9/06* (2013.01); *F25B 11/02* (2013.01);
(Continued)

(58) Field of Classification Search
CPC ... B64D 33/08; F25B 1/10; F25B 9/06; F25B 9/008; F25B 2341/0011; F25B 5/02; F25B 2400/072
See application file for complete search history.

(56) References Cited

U.S. PATENT DOCUMENTS 6,834,514 B2 * 12/2004 Takeuchi ............. B60H 1/3204
62/170
7,140,197 B2 11/2006 Chordia et al.
(Continued)

FOREIGN PATENT DOCUMENTS

EP 0676600 B1 * 3/1995 .............. F25B 11/02
EP 2272757 A2 1/2011
(Continued)

OTHER PUBLICATIONS

Hou et al, "Design and Steup of the Micro-Turboexpander Transcritical CO2 system", 2014, Purdue e-Pubs.*
(Continued)

*Primary Examiner* — Christopher R Zerphey
(74) *Attorney, Agent, or Firm* — Fishman Stewart PLLC

(57) ABSTRACT

A cooling system includes a first heat exchanger for cooling a refrigerant, an expander configured to receive the refrigerant from the first heat exchanger at least one compressor configured to compress the refrigerant, an ejector configured to receive the refrigerant from the expander as a motive stream that evacuates and compresses the refrigerant from an evaporator, and a liquid separator coupled to an output of the ejector and configured to provide liquid refrigerant to an evaporator loop and vapor refrigerant to the at least one compressor. The evaporator loop includes an expansion device positioned to expand the liquid refrigerant from the liquid separator, and the evaporator configured to receive the refrigerant from the expansion device, heat the refrigerant from a heat load, and pass the refrigerant to the ejector.

13 Claims, 8 Drawing Sheets

(51) Int. Cl.
*F25B 41/00* (2006.01)
*F25B 9/06* (2006.01)
*F25B 1/10* (2006.01)
*F25B 11/02* (2006.01)

(52) U.S. Cl.
CPC .............. *F25B 40/00* (2013.01); *F25B 41/00* (2013.01); *F25B 2341/0011* (2013.01); *F25B 2341/0662* (2013.01); *F25B 2400/072* (2013.01); *F25B 2400/14* (2013.01)

(56) References Cited

U.S. PATENT DOCUMENTS

| | | | |
|---|---|---|---|
| 7,178,362 | B2 | 2/2007 | Collings |
| 7,650,763 | B2 * | 1/2010 | Heyl .................. B60H 1/00907 62/324.1 |
| 7,818,978 | B2 | 10/2010 | Ducoulombier et al. |
| 7,845,190 | B2 | 12/2010 | Pearson |
| 8,113,008 | B2 | 2/2012 | Heinbokel et al. |
| 8,327,651 | B2 * | 12/2012 | Finney .................. B64D 13/08 62/114 |
| 2003/0005718 | A1 | 1/2003 | Mitani et al. |
| 2007/0180852 | A1 | 8/2007 | Sugiura et al. |
| 2008/0184717 | A1 | 8/2008 | Sienel et al. |
| 2010/0313582 | A1 | 12/2010 | Oh et al. |
| 2011/0023533 | A1 * | 2/2011 | Shimazu ................... F25B 1/10 62/498 |
| 2011/0036118 | A1 | 2/2011 | Okazaki |
| 2011/0146313 | A1 | 6/2011 | Finckh et al. |
| 2012/0291462 | A1 | 11/2012 | Verma et al. |

FOREIGN PATENT DOCUMENTS

| | | |
|---|---|---|
| JP | S5743172 A | 3/1982 |
| JP | 2010133605 A | 6/2010 |
| JP | 2010133606 A | 6/2010 |

OTHER PUBLICATIONS

Hays et al, A Transcritical CO2 Turbine-Compressor, 2004, Purdue Universite.*
European Search Report for EP Application No. EP14199985 dated May 4, 2015.
Data Sheet indicating No Abstract Available for JPS5743172A.
English Abstract for JP2010133606A.
English Abstract for JP2010133605A.

* cited by examiner

US 10,773,818 B2

TRANS-CRITICAL CO2 COOLING SYSTEM FOR AEROSPACE APPLICATIONS

CROSS-REFERENCE TO RELATED APPLICATIONS

This application claims priority to U.S. Provisional Patent Application No. 61/921,689, filed Dec. 30, 2013, the contents of which are hereby incorporated in their entirety.

FIELD OF TECHNOLOGY

An improved system and method of operating a cooling system in an aerospace application is disclosed, and more particularly, an improved system and method of cooling in a trans-critical operation.

BACKGROUND

It has become increasingly desirable to improve cooling systems in aerospace applications. Typically, cooling systems provide air conditioning, refrigeration and freezer services, and the like for commercial and other aerospace systems. In general, various known options are available for providing cooling, but such options have drawbacks that limit the design options for aerospace applications.

To accommodate the wide range of possible ambient operating conditions of the aircraft, cooling systems for aerospace applications often use a gas-based system. That is, typical cooling systems include a relatively bulky and low efficiency gas-based system in order to cover the range of conditions that can be experienced during aircraft operation.

Some known systems provide a refrigerant that is cooled in an aircraft and passes through an expander and an expansion valve, to an expansion pressure that occurs in the expansion valve. The turbine, in one known system, expands refrigerant from a high pressure to a pressure that is above the dome, and additional expansion occurs in the expansion valve. Effectively, the system is throttled using the expansion valve. However, such operation can result in significant throttling losses and a reduced coefficient of performance (COP).

Thus, there is a need to improve cooling in aircraft.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary cooling system for an aircraft application is described herein, and various embodiments thereof. A cooling system includes a first heat exchanger for cooling a refrigerant, an expander configured to receive the refrigerant from the first heat exchanger at least one compressor configured to compress the refrigerant, an ejector configured to receive the refrigerant from the expander as a motive stream that evacuates and compresses the refrigerant from an evaporator, and a liquid separator coupled to an output of the ejector and configured to provide liquid refrigerant to an evaporator loop and vapor refrigerant to the at least one compressor. The evaporator loop includes an expansion device positioned to expand the liquid refrigerant from the liquid separator, and the evaporator configured to receive the refrigerant from the expansion device, heat the refrigerant from a heat load, and pass the refrigerant to the ejector.

Another exemplary illustration includes a method of cooling that includes cooling a refrigerant in a first heat exchanger, receiving the refrigerant from the first heat exchanger in an expander, compressing the refrigerant in at least one compressor, receiving the refrigerant from the expander in an ejector that is configured to provide a motive stream that evacuates and compresses the refrigerant from an evaporator, and providing liquid refrigerant to an evaporator loop and vapor refrigerant to the at least one compressor from a liquid separator that is coupled to an output of the ejector. The evaporator loop includes an expansion device positioned to expand the liquid refrigerant from the liquid separator, and the evaporator configured to receive the refrigerant from the expansion device, heat the refrigerant from a heat load, and pass the refrigerant to the ejector.

Figure 1:
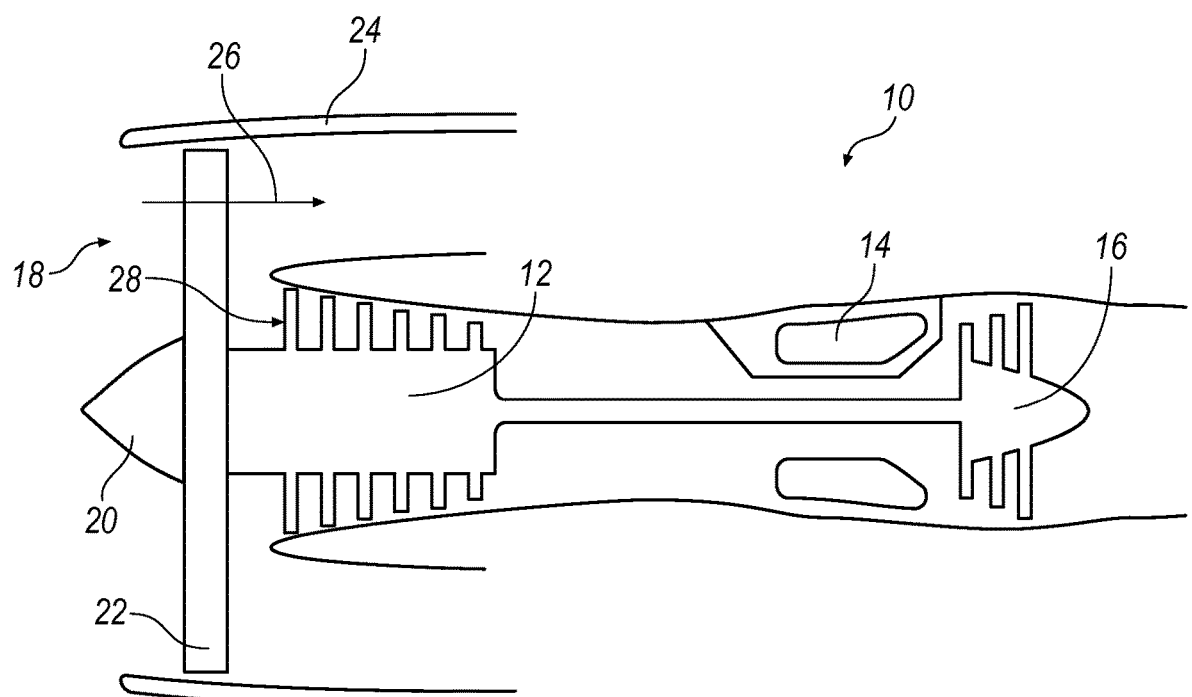
FIG. 1 is an illustration of a gas turbine engine employed in an aircraft and employing the improvements described herein.

FIG. 1 illustrates a schematic diagram of a gas turbine machine 10 that is a primary mover or thrust source for an aircraft, utilizing the improvements disclosed herein. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. Components of turbine machine 10 and as illustrated in FIG. 1 generally do not correspond to components of embodiments of the cooling system in subsequent figures. That is, components of FIG. 1 generally correspond to components of an aircraft engine, whereas components in the subsequent figures (i.e., turbine, compressor) are components used to the cooling systems described and are separate from the components of turbine machine 10.

Figure 2:
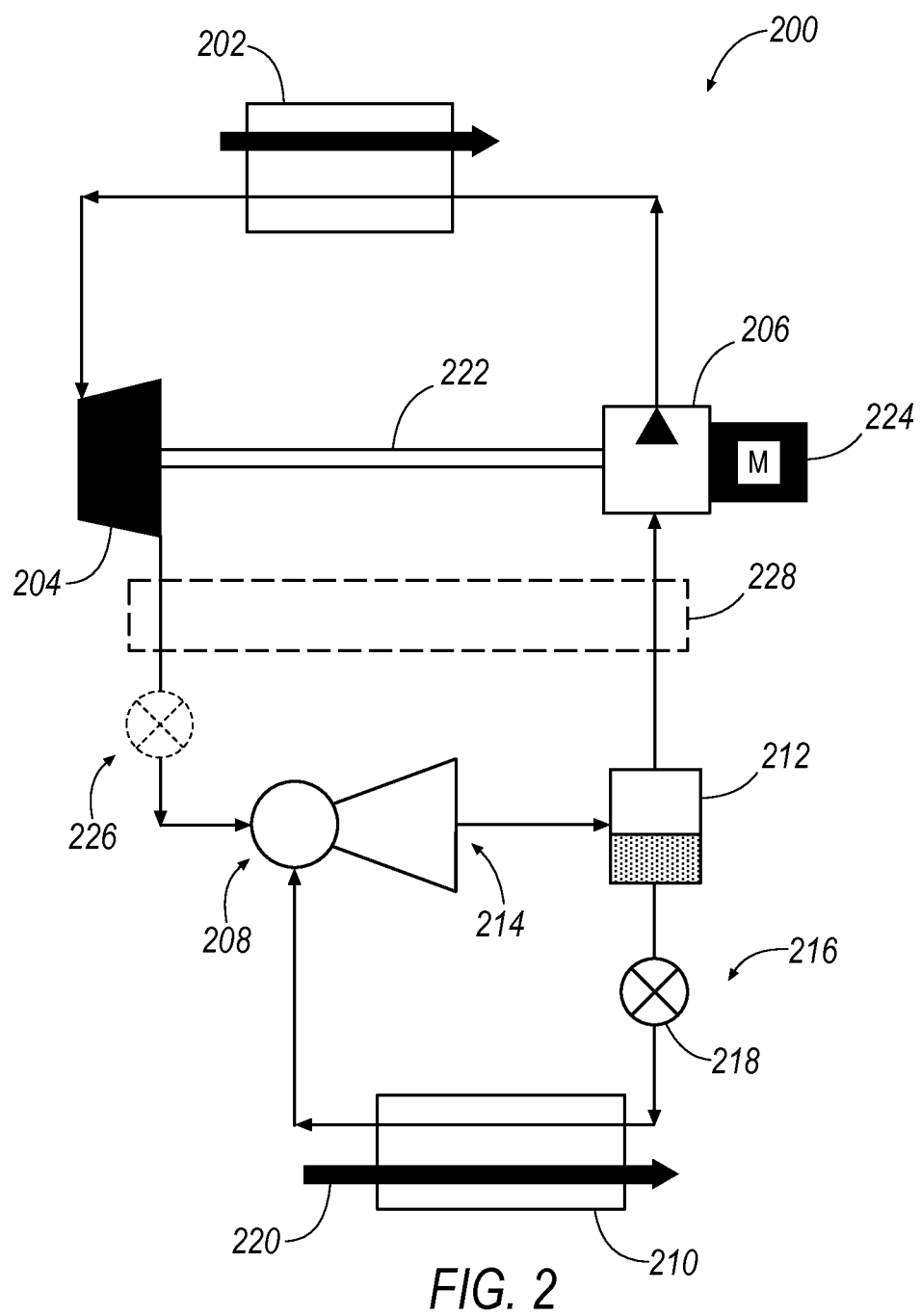
FIG. 2 is an example of a cooling system having one compressor, and an ejector that provides a throttling function.

FIG. 2 illustrates a schematic diagram of a cooling system 200. System 200 includes a refrigerant circuit that includes a heat exchanger or gas cooler 202 for cooling a refrigerant, an expander or turbine 204 that is configured to receive the refrigerant from heat exchanger 202, and a compressor 206 configured to compress the refrigerant. An ejector 208 is configured to receive the refrigerant from expander 204 as a motive stream that evacuates and compresses the refrigerant from an evaporator 210. A liquid separator 212 is coupled to an output 214 of ejector 208 and configured to provide liquid refrigerant to an evaporator loop 216, and provide vapor refrigerant to compressor 206. The evaporator loop 216 includes an expansion device 218 positioned to expand the liquid refrigerant from liquid separator 212, and evaporator 210 is configured to receive the refrigerant from expansion device 218, heat the refrigerant from a heat load 220, and pass the refrigerant to ejector 208.

The heat exchanger 202 is cooled by a cooling fluid and may operate as a condenser or a gas cooler. Cooling fluid states at the inlet to the heat exchanger 202 and thermal loads on the evaporator 210 define the operating conditions of the cooling system 200. The heat exchanger 202 may be cooled by different fluids: air, fuel, RAM air, hydrogenated polyalphaolefin (PAO), water, any secondary refrigerant, fan bypass air or any available appropriate engine stream, as examples. As such, heat is rejected from system 200 via heat rejection heat exchanger 202, and the heat rejection rate is defined by parameters of state of the cooling fluid. Parameters of state of the cooling fluid depend on the application and the fluid itself. For instance, operating conditions of the aircraft may include low static ambient temperatures and low pressures that occur when the aircraft is at high altitude, while high static ambient temperatures and pressures may occur at low altitude or at conditions on a tarmac. These static ambient pressure and temperature, Mach number, and pressure and temperature on the ground define the parameters of RAM air entering the heat rejection exchanger.

In one example, expander 204 is designed as a two-phase expander which means that the leaving state is a two-phase mixture; however, expander 204 may operate in single phase processes and in a vapor area. Expander 204 is coupled to compressor 206 via a rotational shaft 222. The power generated in the expander 204 may not be sufficient to drive compressor 204. Therefore, compressor 206 employs a motor 224 to compensate for insufficient power.

A heat source for evaporator 220 is associated with objects to be cooled (power electronics, HVAC for cabins and passenger compartments, and other mission systems, as examples). Evaporator 210 may cool air in a flight deck, a passenger compartment, or electronics. Alternatively evaporator 210 can cool any of those or all of those via a coolant, which could be PAO, water, a water glycol mixture, or any other secondary refrigerant. Objects to be cooled, such as electronic devices, may be mounted on cold plates, which has channels for boiling refrigerant to execute direct cooling by the refrigerant. System 200 may have multiple condensers 202 using the same or different heat sinks. Also, system 200 may have multiple evaporators 210 using the same or different heat sources and loads.

Suction accumulator 212 provides charge management and is part of a capacity control strategy. When the system cooling capacity exceeds the demand, the non-evaporated refrigerant is stored in suction accumulator 212. In the case of a capacity shortage, the accumulated refrigerant evaporates and resumes operation. In one example, system 200 includes an expansion valve or device 226. As examples, expansion device 214 is an orifice, a thermal expansion valve, an electronic expansion valve, a capillary tube or any other device providing isenthalpic expansion. In another example, system 200 includes a recuperative heat exchanger 228 for extracting heat from refrigerant passing from suction accumulator 212 to compressor 206 via expanded refrigerant from expander 204.

$CO_2$ (carbon dioxide), which enables trans-critical operation by spanning the temperature range from the hot end of system 200 and at heat exchanger 202, to cold end in evaporator 210, is therefore a refrigerant of choice for use with system 200. It will be appreciated that another could be employed. If there is a need to elevate the critical point and extend the two phase region in order to improve the overall system performance a $CO_2$ based mixture (such as $CO_2$ and propane) may be selected as a refrigerant. As such, $CO_2$ serves as a refrigerant that spans the range of operating conditions that may be experienced as changing ambient conditions of, for instance, the aircraft. Exiting the heat rejection exchanger $CO_2$ is a gas when the temperature and pressure are above critical and is a liquid when the temperature and pressure are below critical.

Figure 3:
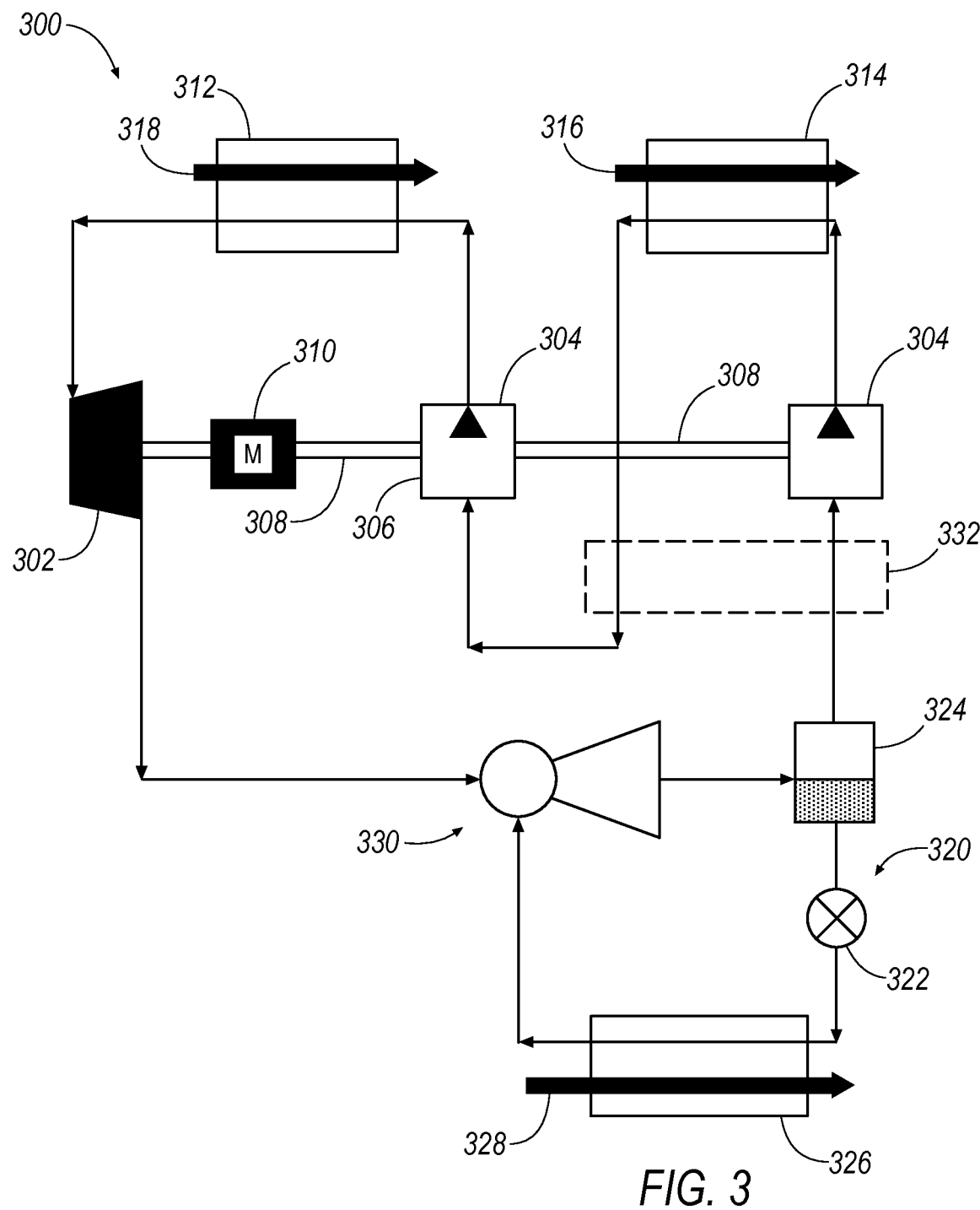
FIG. 3 is an example of a cooling system having two compressors.

FIG. 3 illustrates a schematic diagram of a cooling system 300. System 300 includes an expander or turbine 302 that is coupled to a two-stage compression that includes a first compressor 304 and a second compressor 306. Expander 302 and compressors 304, 306 are coupled together via a shaft 308. A motor 310 is coupled to shaft 308 to provide or augment power to shaft 308 in lieu of or in addition to power extracted from expander 302. System 300 includes a heat exchanger or gas cooler 312 that receives refrigerant from compressor 306 in a second stage of compression. A heat exchanger 314 receives refrigerant in a first stage of compression from compressor 304. Compressor 304 compresses refrigerant to a first pressure, rejects heat to a coolant stream 316, and passes the refrigerant to compressor 306. Compressor 306 compresses the refrigerant to a pressure that is greater than that of compressor 304, which is then cooled in heat exchanger 312 via a coolant stream 318. Thus, a two-stage compression is implemented having generally an improved coefficient of performance (COP) over known single stage systems.

System 300 includes an evaporator loop 320 that includes an expansion device 322 positioned to expand the liquid refrigerant from a liquid separator 324, and an evaporator 326 is configured to receive the refrigerant from expansion device 326, heat the refrigerant from a heat load 328, and pass the refrigerant to an ejector 330. Ejector 330 is configured to receive the refrigerant from expander 302 as a motive stream that evacuates and compresses the refrigerant from evaporator 326. In one example, system 300 includes a recuperative heat exchanger 332 that exchanges heat from the refrigerant stream entering the compressor and the stream exiting the heat exchanger 314, providing improved system efficiency.

In operation, system 300 operates in fashions similar to that described for system 200 of FIG. 2. However, two-stage compression provides additional compression capability and interstage cooling, which is throttled by ejector 330. The heat exchangers 312, 314 may be cooled by different fluids: air, fuel, RAM air, hydrogenated polyalphaolefin (PAO), water, any secondary refrigerant, fan bypass air or any available appropriate engine stream, as examples. In one example, heat exchangers 312, 314 are separate heat exchangers, and in another the heat exchangers are implemented in one device. In both cases the heat exchangers 312, 314 receive air passing into an aircraft for cooling the refrigerant.

Figure 4:
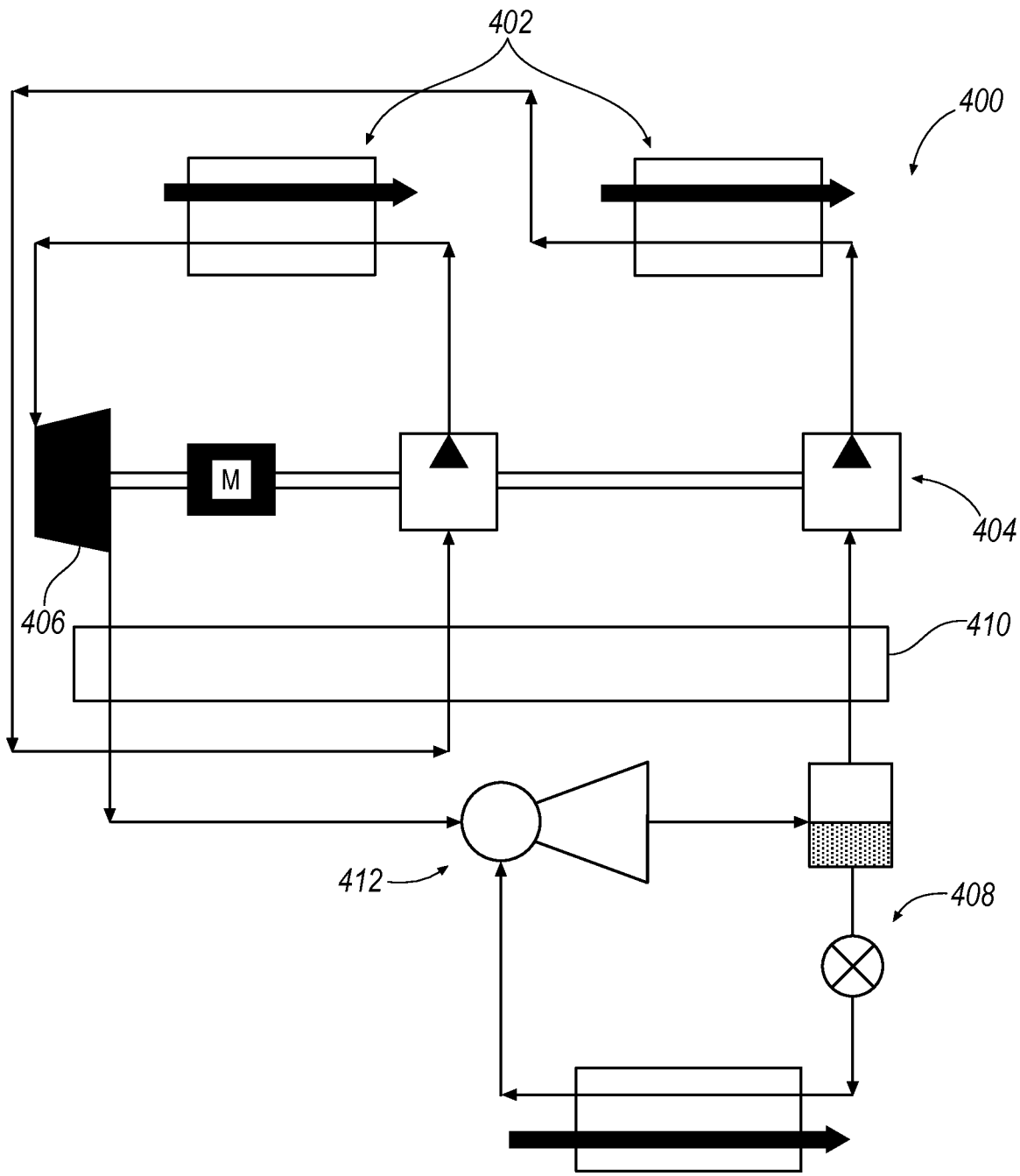
FIG. 4 is an example of a cooling system having two compressors, and a recuperative heat exchanger.

FIG. 4 illustrates a schematic diagram of a cooling system 400. System 400, comparable to the operation of systems 200 and 300, includes one or two heat exchangers or gas coolers 402, a two-stage compressor/shaft 404 having an expander or turbine 406, and an evaporator loop 408. System 400 includes a recuperative heat exchanger 410 that provides cooling to refrigerant streams entering each compressor of two-stage compressor/shaft 404, by using the cooling effect of refrigerant as it exits turbine 406. An ejector 412 is configured to receive the refrigerant from expander 406 as a motive stream that evacuates and compresses the refrigerant from the evaporator in evaporator loop 408.

Figure 5:
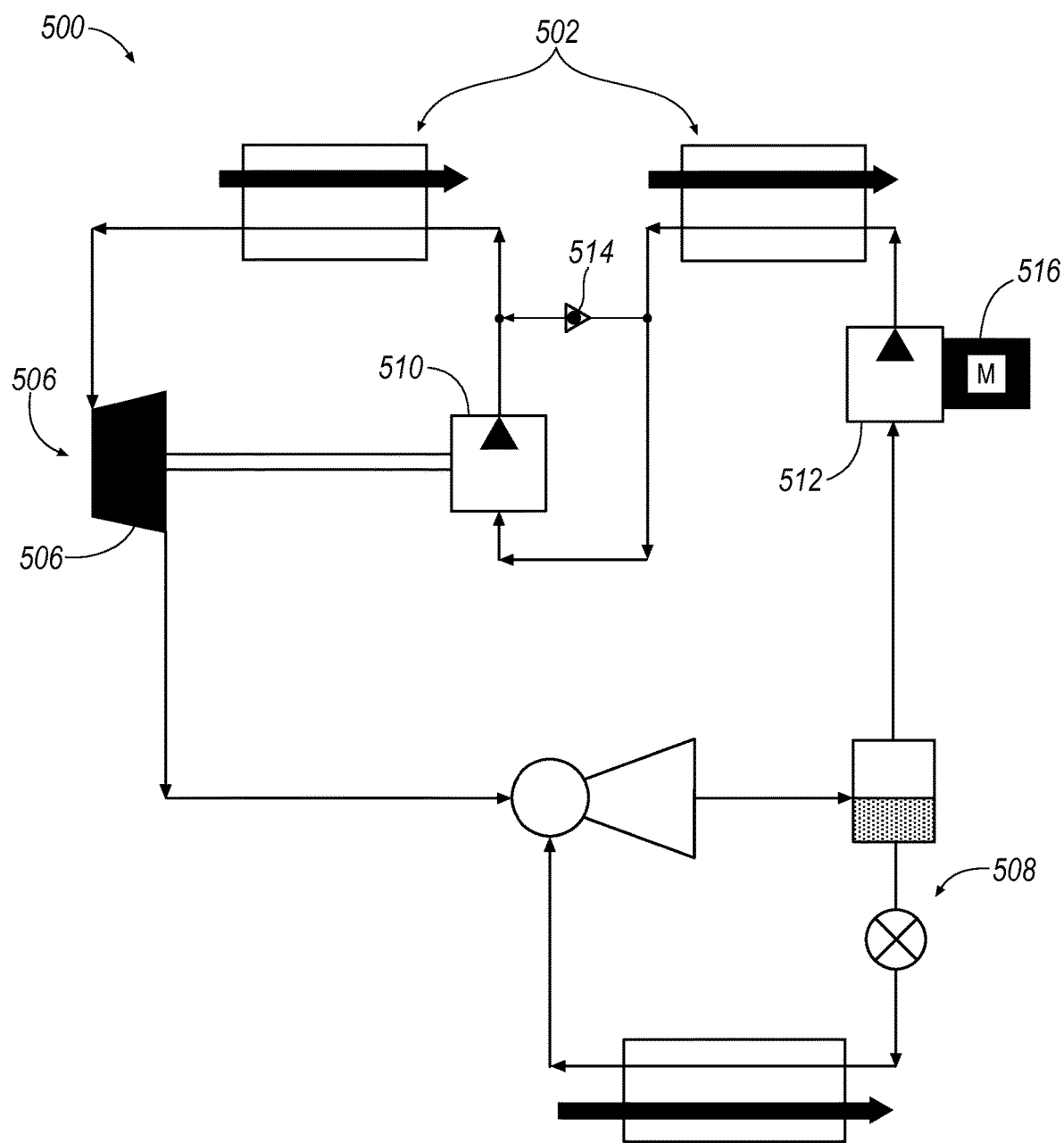
FIG. 5 is an example of a cooling system having two compressors operated independent of one another.

FIG. 5 illustrates a schematic diagram of a cooling system 500. System 500, comparable to the operation of systems 200 and 300, includes one or two heat exchangers or gas coolers 502, and a compressor/expander 504 having an expander or turbine 506, and an evaporator loop 508. Compressor/expander 504 includes a compressor 510 that is driven by turbine 506. Another compressor 512 is included as a first stage compressor operates independent of compressor 510. Compressor 512 compresses refrigerant generally to a pressure that is lower than that of compressor 512. However, a check valve 514 ensures that back-flow does not occur from refrigerant exiting compressor 510. Compressor 512 includes a separate motor or independent power source 516. Thus, in contrast to systems 300 and 400 that include a common shaft between compressors, system 500 includes independent operation of each compressor 510, 512. And, recuperative heat exchangers, though not illustrated, may be employed on system 500 as described with other systems herein. In one example the compressor/expander 504 may have the compressor 510 provided such that the compressor 512 is driven by a motor or any other available prime mover.

Figure 6:
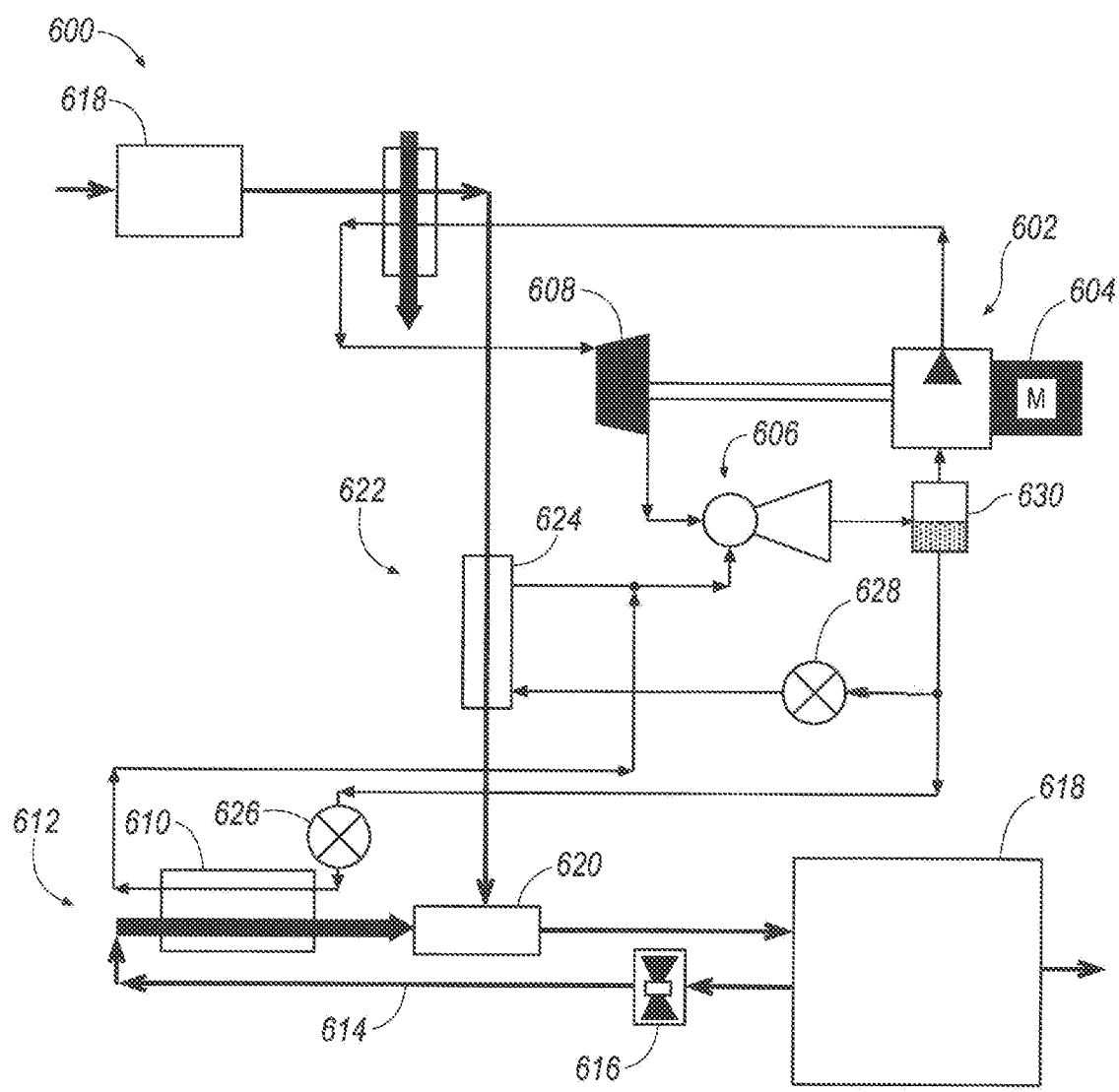
FIG. 6 is an example of a cooling system having two evaporators and two expansion valves to cool main and recirculation streams.

FIG. 6 illustrates a schematic diagram of a cooling system 600 having two evaporators and two expansion valves to cool main and recirculation streams. A compressor/expander 602 (which may include a motor 604) includes an ejector 606 that is configured to receive refrigerant from an expander or turbine 608 as a motive stream that evacuates and compresses the refrigerant from an evaporator 610 in an evaporator loop 612. A recirculating air stream 614 receives air that is moved by a fan 616 and thus provides cooling to elements 618 of an aircraft that include, as examples, a flight deck, a cabin, electronics, and avionics. Air is provided from a pressurized air source 618 that passes air to a mixer 620, which also receives recirculation air passing from evaporator 610. In one example, system 600 includes a second cooling loop 622 that provides cooling to an evaporator 610 and evaporator 624. Each loop 612, 622 includes a respective expansion device or valve 626, 628 that receives refrigerant from a suction accumulator 630 that receives refrigerant from ejector 606.

As such, in operation air from pressurized source 618 is cooled in heat exchanger 624 and recirculation air 614 is cooled in evaporator 610, mixed in mixer 620, and provided cooling to elements 618 for cooling of the aircraft. Refrigerant flow is expanded in ejector 606 and passed to suction accumulator, for vapor refrigerant to pass to the compressor and for liquid refrigerant to pass to expansion devices 626, 628. System 600 also may incorporate two stage compression, recuperative heat exchangers, and other elements of other disclosed systems as well.

Figure 7:
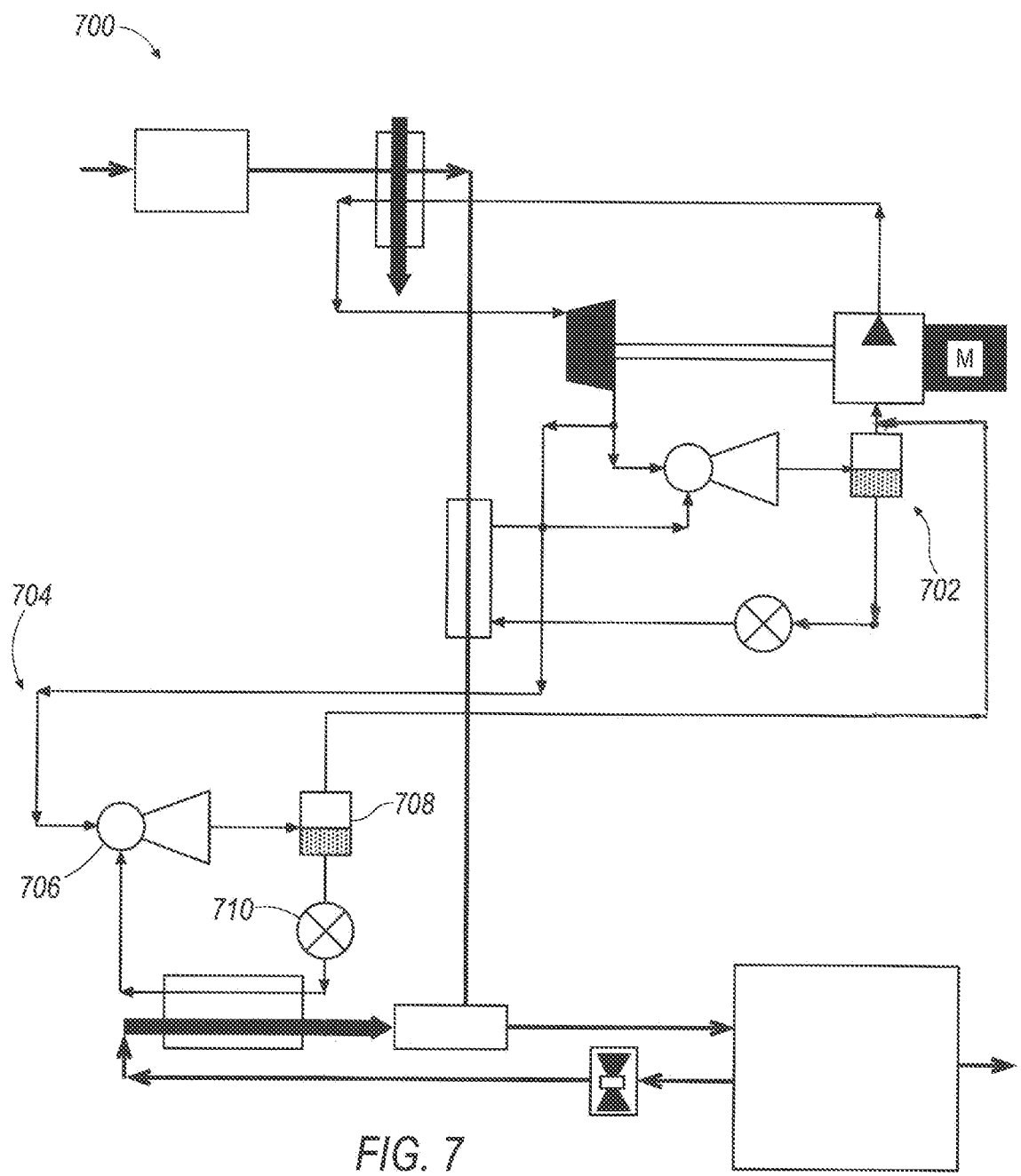
FIG. 7 illustrates an example of a schematic diagram of a cooling system 700 having two ejectors and two expansion valves to cool main and recirculation streams.

FIG. 7 illustrates a schematic diagram of a cooling system 700 having two ejectors and two expansion valves to cool main and recirculation streams. System 700 includes a first cooling loop 702 having a suction accumulator, expansion valve, and ejector as previously described. System 700 operates in similar to fashion as system 600 of FIG. 6, and may also incorporate disclosed elements of other systems, as well. However, system 700 includes a separate cooling loop 704 that includes an ejector 706 and a second suction accumulator 708, as well as a second expansion valve 710. In such fashion the separate loops 702, 704 are separately throttled by their respective suction accumulators, thereby providing additional control, capacity, and flow options.

Figure 8:
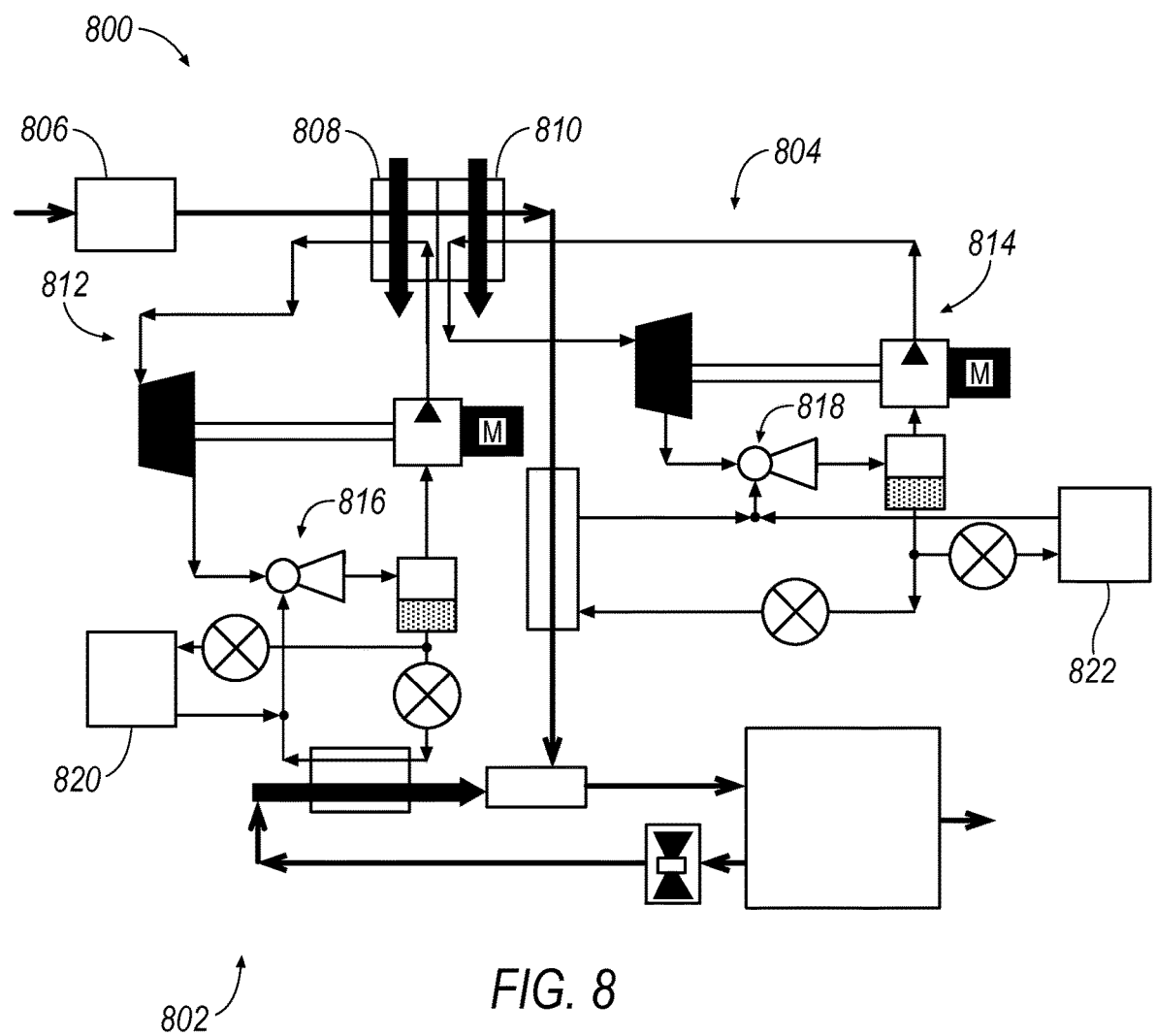
FIG. 8 illustrates an example of a cooling system providing redundancy and having two pressurized air systems.

FIG. 8 illustrates a system 800 that provides two separate cooling systems for aircraft cooling, according to one example. Both systems are sized to provide, in one example, the same capacity as one cooling system would be sized for. However, if one system fails, the second may be available for cooling duty. That is, system 800 includes a first cooling circuit 802, and a second cooling circuit 804, that are each generally thermodynamically separate from one another. Each cooling system 802, 804 includes, in the example shown, two ejectors, two evaporators, and two liquid separators (but in one example, not shown, may include only one liquid separator that is common to each). Pressurized air 806 is passed into first and second gas coolers or heat exchangers 808, 810, which are each cooled by RAM or other coolant as described. Each circuit includes a respective expander/compressor 812, 814, which is throttled by a respective ejector 816, 818. Each circuit 802, 804 includes two expansion valves or devices, and each includes a respective second evaporator 820, 822 to provide additional cooling which may likewise be used to provide coolant to the other circuit. Further, system 800 may incorporate exemplary elements disclosed herein in other systems, as well. Each cooling circuit may cool pressurized air in a first evaporator and the re-circulating air in a second evaporator. Optionally, one cooling circuit may cool pressurized air in two first evaporators and the other circuit may cool the re-circulating air in two second evaporators.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:
1. A cooling system, comprising:
a first heat exchanger for cooling a refrigerant;
a turbine configured to receive the refrigerant from the first heat exchanger;
at least one compressor configured to compress the refrigerant;
an ejector configured to receive all the refrigerant directly from the turbine as a motive stream that evacuates and compresses the refrigerant from an evaporator;
a liquid separator coupled to an output of the ejector and configured to provide liquid refrigerant to a first evaporator loop and vapor refrigerant to the at least one compressor; and
the first evaporator loop comprising:
a first expansion device positioned to expand the liquid refrigerant from the liquid separator; and
the evaporator configured to receive the refrigerant from the first expansion device, heat the refrigerant from a heat load, and pass the refrigerant to the ejector;
further comprising a second evaporator loop comprising:
a second expansion device positioned to expand the liquid refrigerant from the liquid separator;

a second evaporator configured to receive the refrigerant from the second expansion device, heat the refrigerant from a second heat load, and pass the refrigerant to the ejector; and a mixer positioned to receive:
recirculating air from within an aircraft that provides the heat load; and
pressurized air that passes through the second evaporator that provides the second heat load;
wherein the mixer mixes the recirculating air and the pressurized air and provides cooling within the aircraft.

2. The cooling system as claimed in claim 1, wherein the turbine is coupled to the at least one compressor via a shaft to provide power to the at least one compressor from the turbine.

3. The cooling system as claimed in claim 1, wherein the at least one compressor comprises a first compressor that compresses the refrigerant to a first pressure, and a second compressor that compresses the refrigerant to a second pressure that is greater than the first pressure, the system further comprising:
a shaft coupled to the first and second compressors, and to the turbine, to provide power thereto from the turbine; and
a second heat exchanger for cooling the refrigerant from the first compressor, and passing the refrigerant to the second compressor.

4. The cooling system as claimed in claim 3, wherein at least one of the first and second heat exchangers receives air passing into an aircraft for cooling the refrigerant.

5. The cooling system as claimed in claim 3, comprising a recuperative heat exchanger positioned between at least inlets to each of the first and second compressors.

6. The cooling system as claimed in claim 1, wherein the at least one compressor comprises a first compressor that compresses the refrigerant to a first pressure, and a second compressor that compresses the refrigerant to a second pressure that is greater than the first pressure, the system further comprising:
a shaft coupled to the one of the first and second compressors and to the turbine, to provide power thereto from the turbine;
a second heat exchanger for cooling the refrigerant from the first compressor, and passing the refrigerant to the second compressor;
a motor coupled to the other compressor; and
a check valve coupled between an outlet of the second heat exchanger and an outlet of the second compressor.

7. A method of cooling, comprising:
cooling a refrigerant in a first heat exchanger;
receiving the refrigerant from the first heat exchanger in a turbine;
compressing the refrigerant in at least one compressor;
receiving all the refrigerant as a single flow stream from the turbine in an ejector that is configured to provide a motive stream that evacuates and compresses the refrigerant from an evaporator;
providing liquid refrigerant to a first evaporator loop and vapor refrigerant to the at least one compressor from a liquid separator that is coupled to an output of the ejector; and the first evaporator loop comprising:
a first expansion device positioned to expand the liquid refrigerant from the liquid separator; and
the evaporator configured to receive the refrigerant from the first expansion device, heat the refrigerant from a heat load, and pass the refrigerant to the ejector;
further comprising a second evaporator loop comprising:
a second expansion device positioned to expand the liquid refrigerant from the liquid separator;
a second evaporator configured to receive the refrigerant from the second expansion device, heat the refrigerant from a second heat load, and pass the refrigerant to the ejector; and
a mixer positioned to receive:
recirculating air from within an aircraft that provides the heat load; and
pressurized air that passes through the second evaporator that provides the second heat load;
wherein the mixer mixes the recirculating air and the pressurized air and provides cooling within the aircraft.

8. The method as claimed in claim 7, comprising providing power to the at least one compressor from the turbine, wherein the turbine is coupled to the at least one compressor via a shaft.

9. The method as claimed in claim 7, comprising receiving the refrigerant from the turbine and passing the refrigerant to the ejector as the motive stream from the first expansion device.

10. The method as claimed in claim 7, wherein the at least one compressor comprises a first compressor that compresses the refrigerant to a first pressure, and a second compressor that compresses the refrigerant to a second pressure that is greater than the first pressure, the method further comprising:
providing power to the first and second compressors via a shaft that is coupled to the turbine;
cooling the refrigerant from the first compressor in a second heat exchanger, and passing the refrigerant to the second compressor.

11. The method as claimed in claim 10, receiving air passing into an aircraft and into at least one of the first and second heat exchangers for cooling the refrigerant.

12. The method as claimed in claim 10, comprising a recuperative heat exchanger positioned between at least inlets to each of the first and second compressors.

13. The method as claimed in claim 7, wherein the at least one compressor comprises the first compressor that compresses the refrigerant to the first pressure, and a second compressor that compresses the refrigerant to the second pressure that is greater than the first pressure, the method further comprising:
providing power to one of the first and second compressors from the turbine via the shaft;
cooling the refrigerant from the first compressor in a second heat exchanger, and passing the refrigerant to the second compressor; and
providing power to the other compressor via a motor.

* * * * *